United States Patent [19]

Woodruff

[11] 4,197,691
[45] Apr. 15, 1980

[54] DETASSELING DEVICE DEPTH ADJUSTING CONTROL SYSTEM AND METHOD

[75] Inventor: Kenneth A. Woodruff, Clarion, Iowa

[73] Assignee: Hagie Manufacturing Co., Clarion, Iowa

[21] Appl. No.: 945,781

[22] Filed: Sep. 25, 1978

[51] Int. Cl.$^2$ ............................................. A01D 75/28
[52] U.S. Cl. ......................................... 56/10.2; 56/51
[58] Field of Search .............................. 56/10.2, 51–63

[56] References Cited

U.S. PATENT DOCUMENTS

| | | | |
|---|---|---|---|
| 3,196,599 | 7/1965 | Meiners et al. | 56/10.2 |
| 3,524,308 | 8/1970 | Spry | 56/51 |
| 3,710,564 | 1/1973 | Sammann | 56/51 |
| 3,724,184 | 4/1973 | Wright | 56/51 |
| 3,769,782 | 11/1973 | Cler | 56/51 |
| 3,855,761 | 12/1974 | Louks et al. | 56/51 |
| 4,141,200 | 2/1979 | Johnson | 56/10.2 |

FOREIGN PATENT DOCUMENTS 778092 2/1968 Canada ....................................... 56/208

*Primary Examiner*—Russell R. Kinsey
*Attorney, Agent, or Firm*—Rudolph L. Lowell; G. Brian Pingel

[57] ABSTRACT

An automatic depth adjusting control system and method for controlling the vertical position of a pair of corn detasseling devices adjustably mounted on a farm implement for removing tassels from two adjacent rows of corn plants. The control system includes a parallel link system for supporting the corn detasseling devices, a hydraulic cylinder connected to the parallel link system for controlling the vertical movement thereof to raise and lower the pair of corn detasseling devices, and a crop sensing unit positioned forwardly of each of the detasseling devices for detecting the height of the corn plants in a corresponding corn row. Each crop sensing unit provides for the transmission of either a raise signal or a lower signal, in response to the height of the corn plants in an associated row, to electrical circuitry and then hydraulic circuitry for actuating the hydraulic cylinder. In response to such signals, the electrical and hydraulic circuitry raises the detasseling devices upon receiving a raise signal from at least one of the sensing units, and lowers the detasseling devices only upon receiving a lower signal simultaneously from both of the sensing units. The method of the present invention includes the sensing of the plant height of corn in two adjacent rows, and raising or lowering the position of the two corn detasseling devices for such rows relative to the height of the corn plants therein.

5 Claims, 6 Drawing Figures

DETASSELING DEVICE DEPTH ADJUSTING CONTROL SYSTEM AND METHOD

BACKGROUND OF THE INVENTION

1. Field of the Invention

The present invention relates in general to mechanical devices for removing the tassels from corn plants, and more specifically, to a control system for automatically adjusting the vertical position of such devices relative to the height of the corn plants being detasseled.

2. Description of the Prior Art

Various types of mechanical corn detasseling devices are known in the art, and these devices are becoming more common in replacing the manual removal of tassels. Although most mechanical detasselers operate satisfactorily in removing tassels when the corn plants are substantially uniform in height, many of them are ineffective to efficiently remove tassels from corn plants of varying heights.

The most common means presently employed for handling corn plants of varying heights comprise vertically adjustable detasseling devices that are powered for up or down movement in response to a manual control by the operator of the detasseling implement. However, the effectiveness of such manual control is directly dependent upon driving abilities and alertness of the operator. As a result, detasseling takes place at a reduced rate of the speed corresponding to the operator's reaction time in manually adjusting the detasseling devices.

Thus, a need exists for an automatic detasseling apparatus that is vertically adjusted automatically relative to the varying heights of the corn plants encountered. A Canadian Pat. No. 778,092 discloses an automatic height adjusting control for a single cutting bar of a combine that operates in response to variations in crop height, but such control is not satisfactory for a detasseling implement having a plurality of detasseling devices that must simultaneously operate upon corn plants of varying heights in adjacent rows.

SUMMARY OF THE INVENTION

The present invention provides a control system and a method for automatically adjusting the depth of a pair of mechanical corn detasseling devices relative to the height of corn plants being detasseled thereby. The detasseling devices are supported in a transversely spaced apart relation by parallel link systems mounted on a boom extended transversely of a farm implement, and each device includes a power means for controlling the movement of a parallel link system to raise and lower a corn detasseling device.

A sensing means is associated with each of a pair of the corn detasseling devices to detect the height of corn plants in a row being detasseled thereby, and provides a raise signal or a lower signal in response to the height of such corn plants. Circuit means act in response to the signal from the sensing means to actuate the power means to raise the pair of detasseling devices upon receiving a raise signal from at least one of the sensing means, and to lower the detasseling devices solely upon receiving a lower signal simultaneously from both of the sensing means. Thus, the present invention provides a means for controlling the depth of a plurality of detasseling devices relative to the height of corn plants being detasseled so that an efficient detasseling of corn plants is achieved independently of operator control.

The method of the present invention involves the sensing of the height of the corn plants in a pair of rows being detasseled and raising or lowering the corn detasseling devices for the rows relative to the tallest corn plants being encountered.

DESCRIPTION OF THE PREFERRED EMBODIMENT

Figure 1:
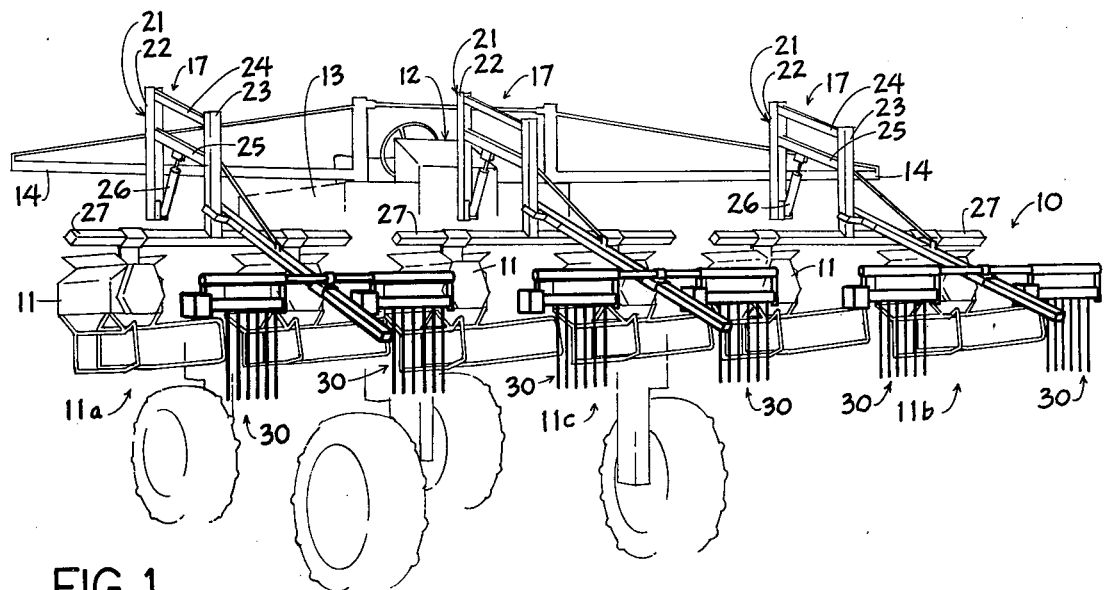
FIG. 1 is a front perspective view of a tractor having three pairs of corn detasseling device mounted thereon and wherein a preferred embodiment of the control system of the present invention is associated with each pair thereof.

The present invention provides a system for automatically controlling the vertical position of a plurality of pairs of mechanical corn detasseling devices, and is shown generally at 10, in FIG. 1, in assembly relation with three pairs of detasseling devices 11 each of which is of a standard roller type design readily obtainable through customary agricultural outlets. A tractor vehicle 12 which carries the detasseling devices 11, has an elevated body 13 to the front end of which are fixed transversely extended boom sections 14. The detasseling devices 11 are mounted by pivotal support assemblies 17 in transversely spaced apart pairs, with a first pair 11a mounted from one end boom section 14, a second pair 11b mounted from the other end boom section 14, and a third pair 11c mounted from the front of the tractor body 13.

A support assembly 17 for a pair of detasseling devices 11a, 11b and 11c includes a parallel link system 21 having a pair of longitudinally spaced apart upright parallel links 22 and 23 that are pivotally connected together at their upper portions by an upper link 24 and approximately at their center portions by a lower link 25. The upright links 22 associated with the pairs of detasseling devices 11a and 11b are fixed to the boom sections 14, and the upright link 22 associated with the pair of devices 11c is fixed to the front of the tractor body 13. A hydraulic cylinder 26 is connected between each lower link 25 and upright link 22 for vertically adjusting the link systems 21.

Figure 2:
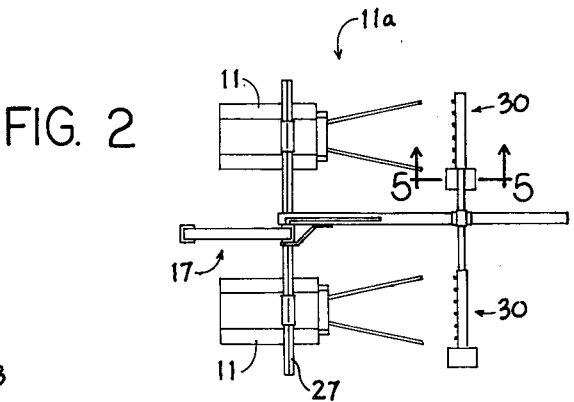
FIG. 2 is a plan view of a single pair of the corn detasseling devices and associated control system of FIG. 1.
Figure 3:
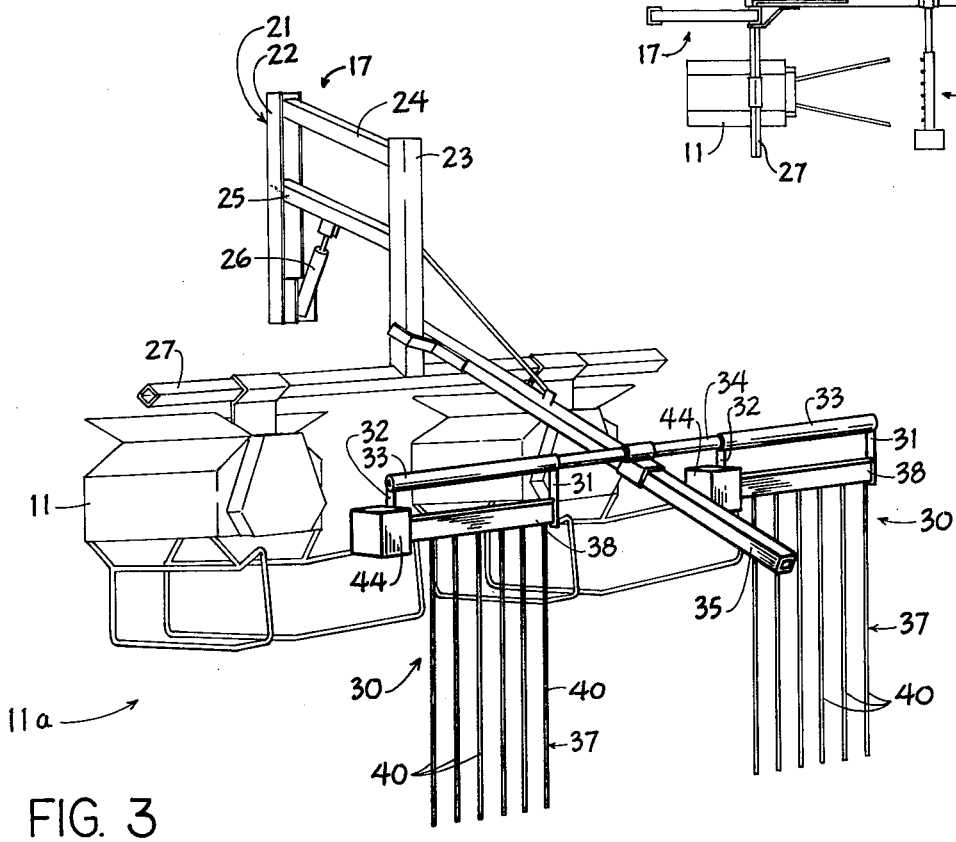
FIG. 3 is an enlarged perspective view of the detasseling devices and control system of FIG. 2.

Referring to FIGS. 2 and 3, each support assembly 17 also includes a mounting bar 27 that is fixed to the bottom end of the upright link 23 in parallel alignment with the boom sections 14. The pairs of detasseling devices 11a–11c are rigidly suspended from an associated mounting bar 27, which is raised or lowered by means of the hydraulic cylinder 26.

The control system 10 is adapted to provide an automatic adjustment of each of the hydraulic cylinders 26 in order that each pair of the detasseling devices 11a–11c is adjusted to a proper depth for contacting the tassels of corn plants in two adjacent rows of corn. The means included in the control system 10 for providing this operation is identical for each pair of the devices 11a–11c and, therefore, the construction and operation of the control system 10 will be described only with reference to the pair of detasseling devices 11a with like parts being indicated by like numerals.

Figure 4:
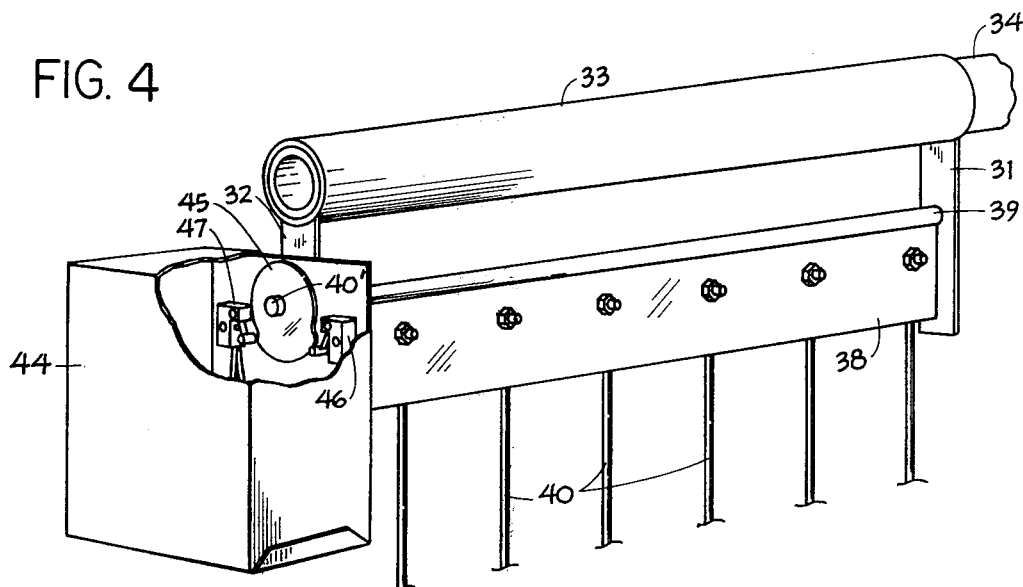
FIG. 4 is an enlarged perspective view of a sensing unit of the control system of FIG. 1.

The control system 10 includes a pair of crop height sensing units 30, disposed forwardly of and corresponding to the pair of detasseling devices 11a. The sensing units 30 are suspended by brackets 31 and 32 (FIG. 3) from tubular sleeves or bearings 33 carried on opposite ends of a tubular mounting bar 34. A beam 35 projected forwardly from the upright link 23 of the associated parallel link system 21 supports the mounting bar 34 transversely of the tractor 12. Each sensing unit 30 has a sensor or feeler assembly 37 with a swing arm 38 having stub shafts 39 and 40′ (FIG. 4) journaled in the brackets 31 and 32, respectively. A plurality of downwardly depended spaced apart sensor rods 40 are bolted at their upper ends to the swing arm 38 for swinging movement therewith.

Figure 5:
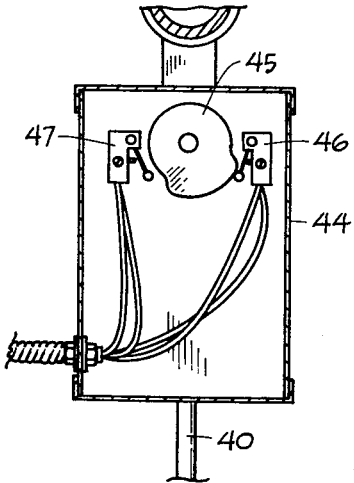
FIG. 5 is an enlarged sectional view taken on line 5—5 of FIG. 2.
Figure 6:
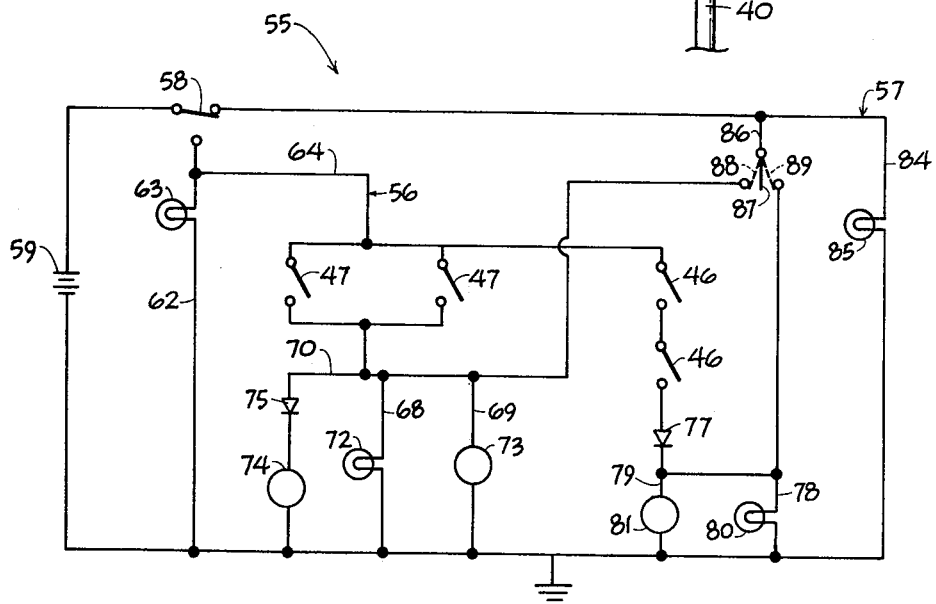
FIG. 6 is an electrical schematic diagram of the circuitry for the control system of FIG. 1.

Cam housings 44 also form part of the sensing units 30 and are mounted on the brackets 32 for enclosing rotatable switch cams 45 fixed on the shafts 40 for rotational movement therewith. Two micro-switches 46 and 47 are mounted in each of the housings 44 adjacent the periphery of an associated cam 45 for alternate actuation thereby in response to the fore and aft swinging movement of the sensor assembly 37. Referring to FIG. 5, the micro-switch 46 is actuated, when the associated sensor assembly 37 is within a ten degree range of the vertical position therefor, to provide a lowering control for the pair of detasseling devices 11a. The micro-switch 47 is actuated when the sensor assembly 37 is rearwardly pivoted approximately thirty degrees from a vertical position to provide a raise control of the detasseling devices 11a. Thus, there is a twenty degree dead gap range between the raise and lower positions of the sensor assembly 37.

During a detasseling operation, movement of the swing arms 38 of the sensor assemblies 37 is controlled in response to the height of the corn plants being detasseled. The sensor rods 40 of the sensor assemblies 37 are sufficiently spaced apart so that when the pair of detasseling devices 11a are at a proper detasseling height for the height of the corn plants being detasseled, contact of the sensor rods 40 with the upper leaf portions of the corn plants will swing the sensor assemblies 37 rearwardly from a vertical position into the dead gap or band range. Thus, the cam 45 will not actuate either of the switches 46 or 47, and the vertical position of height of the detasseling devices 11a will remain unchanged. However, if short corn plants are encountered during the detasseling operation, the sensor assemblies 37 will move from the dead band range toward a substantially vertical position to actuate the micro-switches 46, to provide a lower control signal. Correspondingly, when tall corn plants are encountered, the sensor assemblies 37 will engage more of the corn plant leafs and will be pivoted rearwardly from the dead band position until the micro-switch 47 is actuated to provide a raise control signal.

The micro-switches 46 and 47 of the two row sensing units 30 form a portion of an electrical control circuit 55 that responds to the control signals from the sensing units 30 to raise or lower the pair of detasseling devices 11a by actuating the hydraulic cylinder 26 for the associated link system 21. The control circuit 55 will respond to a raise control signal from only one of the sensing units 30 to provide a raise adjustment of the pair of detasseling devices 11a relative to the height of the tallest corn plants being encountered by either of the units 30. In contrast, the control circuit 55 will not respond to a lower control signal from only one of the sensing units 30, but must have a lower control signal from both sensing units 30 simultaneously before it will actuate the hydraulic cylinder 26 to lower the pair of detasseling devices 11a relative to the height of the shortest corn plants in both corn rows. This means that the lower control operation of the system 10 is keyed to the tallest corn plants being encountered by either of the units 30. Accordingly, areas devoid of corn plants in the corn row monitored by only one of the sensing units 30, will not actuate the lowering control of the system 10.

In addition to providing automatic depth adjustment of the pair of detasseling devices 11a by means of an automatic circuit branch 56, the electrical control circuit 55 also provides a manual adjust control therefor by means of a manual circuit branch 57 that is connected in parallel with the automatic circuit branch 56. A standard single pole, two position switch 58 is connected in series with a source of electrical power 59, such as the battery of the tractor 12, for alternately connecting either the circuit branch 56 or the branch 57 with the power source 59.

The automatic circuit branch 56 includes a first line 62 with a signal light 63 connected directly to ground to indicate when the circuit 55 is in an automatic mode. A second line 64 is connected in parallel with the line 62 and leads to the raise control micro-switches 46 and the lower control micro-control switches 47.

The micro-switches 47 are connected in parallel with one another so that when either switch 47 is actuated to a closed condition, the line 64 will be connected to three parallel circuit lines 68–70 leading to ground, and containing, respectively, a signal light 72; a solenoid 73 for directing hydraulic fluid to the blind end of the associated hydraulic cylinder 26; and a fluid pump 74 for delivering hydraulic fluid to be directed by the solenoid 73 and a directional diode 75 series connected with the pump 74. Thus, when the control circuit 55 is in the automatic mode and one of the micro-switches 47 is closed, hydraulic fluid will be supplied to the blind end of the associated hydraulic cylinder 26 to raise the pair of detasseling devices 11a.

The micro-switches 46 are connected in a series relation with one another in the circuit branch 56. Thus, only when both switches 46 are closed simultaneously will the line 64 be connected through a directional diode 77 to two parallel lines 78 and 79 that contain, respectively, a signal light 80; and a solenoid 81 for controlling the release of fluid from the blind end of the associated hydraulic cylinder 26. Accordingly, control circuit 55 will lower the pair of detasseling devices 11a only when the circuit 55 is in the automatic mode with both of the switches 46 closed.

The manual circuit branch 57 includes a first line 84 with a signal light 85 connected to ground to indicate when the circuit is being operated in the manual mode. A second line 86 includes a standard single pole three position toggle switch 87 that in a first actuated position 88 connects the parallel lines 68–70 with the line 86, and in a second actuated position 89 connects the lines 78 and 79 with the line 86. Thus, the manual circuit branch 57 provides a positive raise or lower control of the pair of detasseling devices 11a by entirely bypassing the micro-switches 46 and 47.

As previously stated, the vertical adjustment of the pairs of detasseling devices 11b and 11c is automatically or manually controlled in the same manner as the devices 11a. Accordingly, the control system 10 entirely eliminates the need for relying on operator control for making depth adjustments of the detasseling devices 11a–11c, so that efficient and effective removal of corn tassels is achieved.

I claim:

1. An automatic depth adjusting control system for a pair of mechanical corn detasseling devices adapted to remove tassels from two adjacent rows of corn plants suspended from a parallel link system mounted on a farm implement for movement of said detasseling devices in the direction of travel of said implement, said system comprising:
    (a) power means connected to said parallel link system for controlling the movement thereof to raise and lower said pair of corn detasseling devices,
    (b) a sensing means positioned forwardly of each of said detasseling devices for detecting the height of the corn plants in an associated row and providing a raise signal or a lower signal relative to the height of said corn plants, and
    (c) circuit means for actuating said power means to raise said pair of detasseling devices upon receiving a raise signal from at least one of said sensing means and to lower said pair of detasseling devices only upon receiving a lower signal simultaneously from both of said sensing means.

2. An automatic depth adjusting control system according to claim 1 wherein said sensing means each comprise:
    (a) at least two electrical switch means;
    (b) pivotable means for contacting the corn plants in said associated row and moving in response to said contact,
    (c) switch actuating means connected to said pivotable means for movement therewith and for engaging said electrical switch means as a result of said movement.

3. An automatic depth adjusting control system according to claim 2 wherein said sensing means are supported by a support structure connected to said parallel link system and having a mounting bar transverse to the tractor and bracket means on said bar, said pivotable means comprising:
    (a) an arm having stub shafts at opposite ends thereof journaled in said bracket means; and
    (b) spaced apart sensor rods fixed to said pivotal arm in a downwardly depended relation thereto.

4. An automatic depth adjusting control system according to claim 3 wherein said switch actuating means includes:
    (a) a cam mounted on one of the stub shafts of said pivotal arm for engaging one of said switch means when said sensor rods are within a ten degree range of being in a vertical position and for engaging the other of said switch means when said sensor rods are inclined at an angle of at least thirty degrees from a vertical position.

5. A method for automatically adjusting the depth of a pair of mechanical corn detasseling devices adapted to remove tassels from two adjacent rows of corn plants and suspended from a parallel link system mounted on farm implement, said method comprising the steps of:
    (a) separately sensing the height of the corn plants in each of said adjacent rows forwardly of said detasseling devices;
    (b) providing raise or lower control sensing signals relative to the height of the corn plants in said adjacent rows;
    (c) raising said pair of detasseling devices in response to separate raise control signals; and
    (d) lowering said pair of detasseling devices only in response to simultaneous lower control signals.

* * * * *